No. 896,377. PATENTED AUG. 18, 1908.
J. M. GOODKNIGHT.
BRAKE FOR RAILWAY CARS.
APPLICATION FILED APR. 30, 1908.
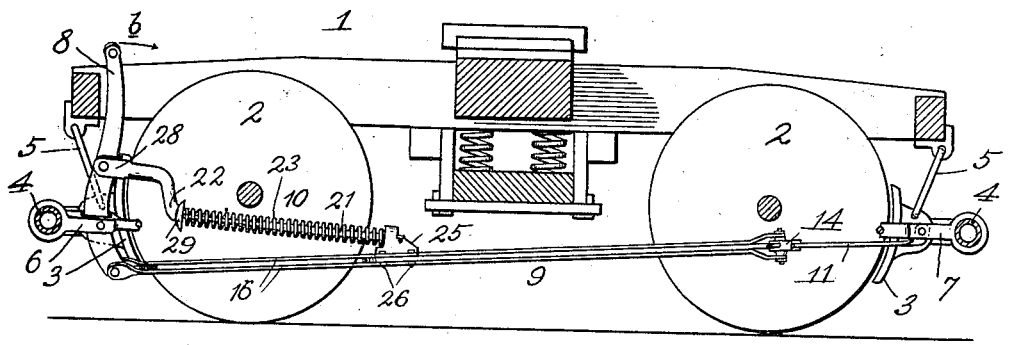
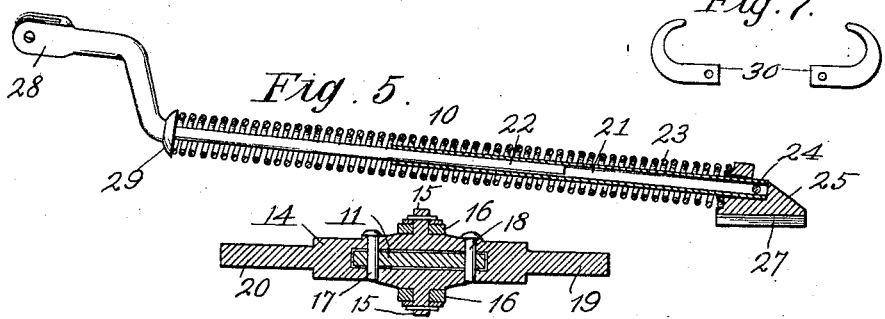
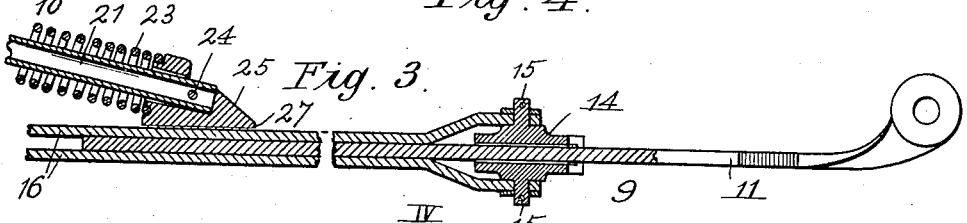
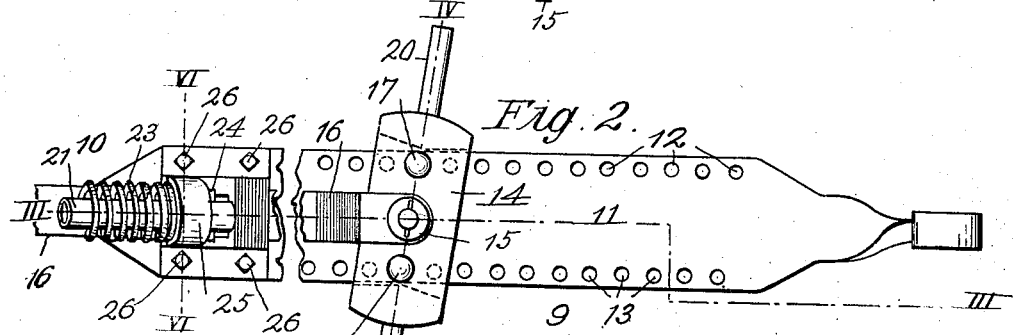
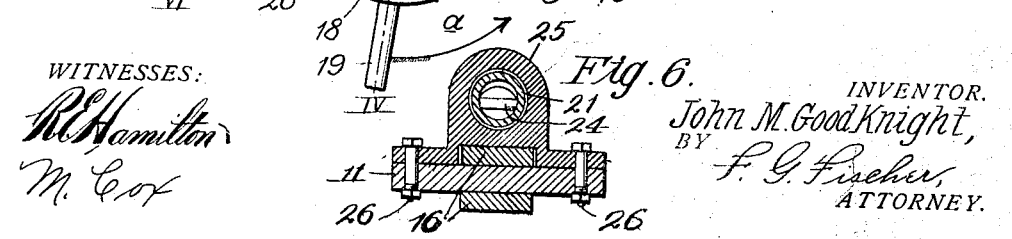
WITNESSES:
R. E. Hamilton
M. Cox
INVENTOR.
John M. Goodknight,
BY F. G. Fischer,
ATTORNEY.

UNITED STATES PATENT OFFICE.

JOHN M. GOODKNIGHT, OF KANSAS CITY, KANSAS.

BRAKE FOR RAILWAY-CARS.

No. 896,377.      Specification of Letters Patent.      Patented Aug. 18, 1908.

Application filed April 30, 1908. Serial No. 430,091.

*To all whom it may concern:*

Be it known that I, JOHN M. GOODKNIGHT, a citizen of the United States, residing at Kansas City, in the county of Wyandotte and State of Kansas, have invented certain new and useful Improvements in Brakes for Railway-Cars, of which the following is a specification.

My invention relates to improvements in brakes for railway cars, and it pertains more particularly to bottom-rods and springs for adjusting and releasing the brake-shoes.

The invention embraces a novel bottom-rod for taking up all slack existing in the brake-gear and for adjusting the brake-shoes toward the wheels as the shoes and the wheels become worn.

The invention also embraces a releaser for disengaging the brake-shoes from the wheels when it is desired to unlock the latter.

The bottom-rod may be used to advantage with the ordinary brake-shoe releasing-springs now in general use, but I prefer to use it in conjunction with my releaser as the two coöperate in producing results not obtainable when one is used without the other.

In order that the invention may be fully understood, reference will now be made to the accompanying drawing, in which:

Figure 1 represents a vertical section of a car truck provided with my invention. Fig. 2 is an enlarged broken plan view of the invention. Fig. 3 is a vertical longitudinal section on line III—III of Fig. 2. Fig. 4 is a cross section on line IV—IV of Fig. 2. Fig. 5 is a longitudinal section of the releaser employed in carrying out the invention. Fig. 6 is a cross section on line VI—VI of Fig. 2. Fig. 7 shows a pair of hook attachments employed in carrying out the invention.

1 designates a truck which may be of any type now in use, and is mounted upon wheels 2.

3 designates a pair of brake-shoes secured to a pair of brake-beams 4, suspended from the truck by a plurality of links 5. One of the brake-beams is provided with a fork 6, while its companion has a similar fork 7.

8 designates a brake-lever pivotally secured to fork 6.

9 designates my improved bottom-rod which is pivotally secured at its ends to fork 7 and the lower end of lever 8.

10 designates my improved brake-releaser which is pivotally connected at one end to lever 8, above fork 6, and secured at its opposite end to the bottom-rod 9.

Bottom-rod 9 consists of a bar 11 having two marginal rows of holes 12 13, an adjusting-block 14, movable on bar 11 and provided with centrally-disposed vertical trunnions 15, and a pair of bars 16 pivotally secured at their ends to trunnions 15 and the lower end of lever 8. Adjusting-block 14 is provided with oppositely-disposed removable pins 17 18, the former of which is adapted to engage any of the holes 12, while the latter is adapted to engage any of the holes 13. Said block is also provided at its ends with handles 19 20 whereby it is operated.

Releaser 10 consists of a tube 21 and a rod 22, telescopically connected, and an expansion spring 23 encircling the same. The inner end of tube 21 is secured by a transverse pin 24 in a seat 25, secured to the inner end of bar 11 by bolts 26. Said seat has a recess 27 in its underside through which the uppermost bar 16 loosely extends. Rod 22 has an outer forked terminal 28 which is pivotally connected to lever 8 above fork 5, and said rod is provided near its outer terminal with a circular shoulder 29 against which the forward end of spring 23 abuts. By compressing the spring between seat 25 and shoulder 29 it will exert constant pressure to force rods 9 and 22 in opposite directions and thus hold the brake-shoes away from wheels 2. When lever 8 is drawn in the direction of arrow *b*, by the air-brake mechanism, to lock the brake-shoes against the wheels, the spring is further compressed and hence will instantly restore said lever and the brake-shoes to normal when the air is released from the air-brake mechanism.

When it is desired to take up slack or wear of the brake-gear, the bottom-rod 9 is shortened by moving the adjusting-block 14 in the direction of arrow *a*, step by step. This is accomplished by alternately using pins 17 and 18 as fulcrums on which to swing the adjusting-block. For instance, when the adjusting-block occupies the position shown in Fig. 2, pin 18 is removed so that the adjusting-block may be swung forward one step on pin 17, pin 18 is then placed through the block and the next hole 13 to form the fulcrum and pin 17 is removed so that the block may be swung forward one step on said pin 18. This operation is repeated until the desired adjustment of the brake-gear has been attained. As the expansion spring will offer resistance to the shortening of the bottom-rod, it will be necessary to apply levers of some kind to handles 19 20, to obtain sufficient power to move the adjusting-block step by step.

By removing releaser 10 from the bottom-rod 9 and attaching a pair of hooks 30 to the ends of said rod the latter is readily converted into a clamp whereby the brake-shoes may be temporarily drawn against wheels 2 when it is desired to adjust the old style bottom-rod, consisting usually of two pieces having adjacent threaded ends engaged by a turn-buckle whereby the rod may be shortened or lengthened. The principal objections to the old style rod are first, that it is easily bent and thus disarranges the brake mechanism, and second, it is difficult to adjust on account of its threads rusting in the turn-buckle and rendering the latter difficult to turn. As my improved rod has three thicknesses of metal throughout the greater portion of its length, and has no threads to rust, it is obvious that the objections above pointed out have been overcome.

Having thus described my invention, what I claim is:—

1. The combination with a brake mechanism including brake-beams and a brake-lever, of a bottom-rod connected to the brake-lever and one of the brake-beams, consisting of a plurality of sections adjustably connected so that said rod may be lengthened or shortened and an adjusting-block connecting said sections.

2. The combination with a brake mechanism including brake-beams and a brake-lever, of a bottom-rod consisting of three sections two of which are connected to one of the brake-beams while the other is pivotally connected to one of the brake-beams, and a member adjustably connecting said sections whereby the bottom-rod may be lengthened or shortened.

3. The combination with a brake mechanism, of a bottom-rod therefor consisting of a section connected to one of the brake-beams and provided with holes, a member adjustably mounted upon said section provided with means for entering the holes thereof, and one or more sections connected to the adjustable member and the brake-lever of the brake mechanism.

4. The combination with a brake mechanism, of a bottom-rod therefor consisting of a section connected to one of the brake-beams and provided with two rows of holes, a member adjustably mounted upon said section provided with pins for entering the holes thereof, and one or more sections connected to the adjustable member and the brake-lever of the brake mechanism.

5. The combination with a brake mechanism, of a bottom-rod therefor consisting of a section connected to one of the brake-beams and provided with holes, a block adjustably mounted upon said section provided with a pair of trunnions and means for entering holes in the section, and two sections pivotally connected at their ends to the block and the brake-lever of the brake mechanism.

6. The combination with a brake mechanism including brake-beams and a brake-lever, of a bottom-rod connected to the brake-lever and one of the brake-beams, consisting of a pair of bars connected to the brake-lever, another bar provided with holes, having its inner end arranged between the first-mentioned bars and its outer end connected to one of the brake-beams, an adjusting-block pivotally connected to the pair of bars and provided with handles whereby it may be moved step by step upon the other bar, and means carried by the adjusting block for entering the holes of said other bar.

7. The combination with a brake mechanism including a pair of brake-beams, of a rod consisting of a plurality of sections, a block adjustably connecting said sections so the rod may be lengthened or shortened, and hooks at the end of said rod for engaging the brake-beams.

8. The combination with a brake mechanism including brake-beams and a brake-lever, of a bottom-rod connected to the brake-lever and one of the brake-beams, consisting of a plurality of sections adjustably connected so that said rod may be lengthened or shortened; and a releaser connected at its ends to the brake-lever and the bottom-rod.

9. The combination with a brake mechanism including a bottom-rod and a brake-lever, of a releaser connected to the bottom-rod and the brake-lever.

10. The combination with a brake mechanism including a bottom-rod and a brake-lever, of a telescopic member connected to the bottom-rod and the brake-lever, and an expansion member for extending said telescopic member.

In testimony whereof I affix my signature, in the presence of two witnesses.

JOHN M. GOODKNIGHT.

Witnesses:
 F. G. FISCHER,
 M. COX.